United States Patent [19]

Schwend

[11] 4,083,139
[45] Apr. 11, 1978

[54] ICE FISHING APPARATUS

[76] Inventor: Gerald M. Schwend, 880 Washakie, Lander, Wyo. 82520

[21] Appl. No.: 735,059

[22] Filed: Oct. 22, 1976

[51] Int. Cl.² .................... A01K 97/00; A01K 97/12
[52] U.S. Cl. ............................................................ 43/16
[58] Field of Search ...................................... 43/16, 15

[56] References Cited

U.S. PATENT DOCUMENTS

| 1,488,838 | 4/1924 | Savoie | 43/15 |
| 1,996,704 | 4/1935 | Hawkinson | 43/16 |
| 2,924,038 | 2/1960 | Dahlgren | 43/16 |
| 3,474,561 | 10/1969 | McConkey | 43/16 |

Primary Examiner—Edgar S. Burr
Assistant Examiner—Daniel J. Leach
Attorney, Agent, or Firm—Arthur L. Urban

[57] ABSTRACT

An ice fishing apparatus including a main support member, a cross member disposed transversely of said support member and attached thereto, a trigger mounted on said support member near one end thereof, a fishing line-storing means disposed on said support member, an arm positioned between said trigger and said line-storing means pivotally connected to said support member with the pivot point of said arm adjacent the end thereof remote from said trigger, biasing means urging the free end of said arm away from said support member, and line-guiding means on said arm.

7 Claims, 3 Drawing Figures

ICE FISHING APPARATUS

This invention relates to a novel ice fishing apparatus and more particularly, relates to a unique ice fishing apparatus which minimizes loss of fish after they are hooked.

It is customary for an ice fisherman to fish a number of holes at the same time. Since the fisherman cannot personally attend all of his lines simultaneously, signal devices may be attached to each line to alert the fisherman when a fish has taken the hook on a particular line. Such devices, called "tip-ups", utilize a center-pivoted arm so that when a fish pulls on a line attached to one end of the arm, the opposite end will be raised. A flag may be fastened to the end which is raised to attract the attention of the fisherman so he can hurry to the hole and pull on the line to set the hook in the fish's mouth to prevent the fish spitting out the hook.

However, a fish may be lost if the fisherman does not reach the line quickly. Unless the fisherman diligently watches his lines, he may not notice when the device is first tipped. Furthermore, such devices detract from a fisherman's enjoyment of the sport since it not only is boring to be required to direct one's full attention to the devices, but also it is difficult to concentrate on the devices for any extended period. Moreover, it is disappointing to lose a fish after it has taken a hook because of a delay in reaching the line and setting the hook.

The present invention provides a novel ice fishing apparatus with important advantages over devices used heretofore. The apparatus of the invention automatically sets the hook when a fish takes the line, but does not operate prematurely if a fish is only mouthing the hook. Thus, the apparatus of the invention allows the fisherman more time to reach the line without losing his fish and as a result requires less attention by him. A further advantage of the apparatus of the invention is its simplicity which enables it to be manufactured in quantity relatively inexpensively.

Other advantages of the invention will be apparent from the following detailed description and the accompanying drawings in which.

Figure 1:
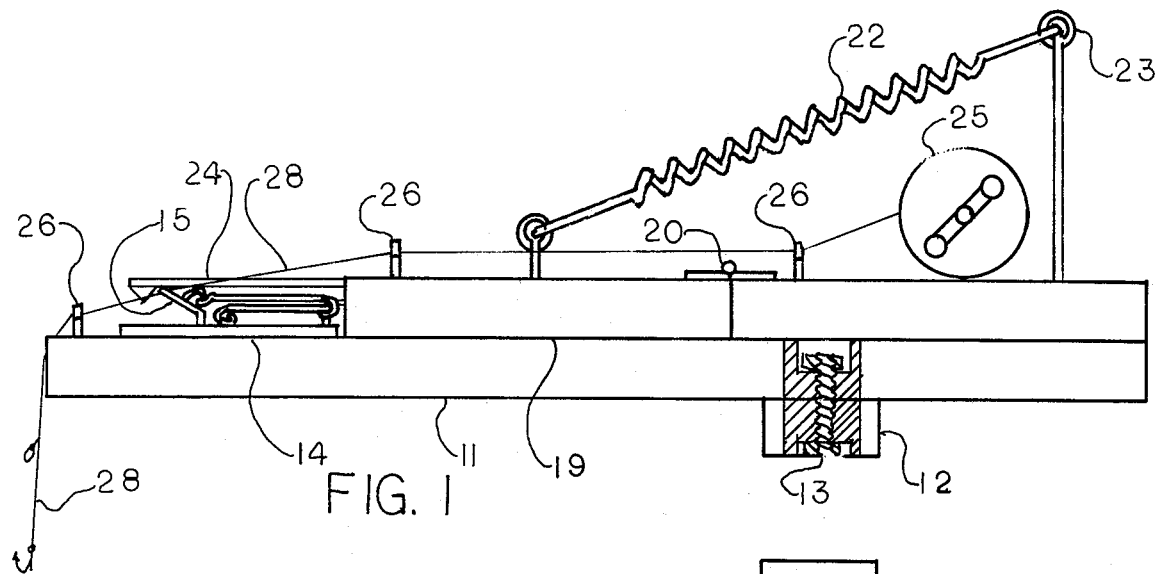
FIG. 1 is a side elevation of one form of ice fishing apparatus of the present invention before the trigger has been tripped.
Figure 2:
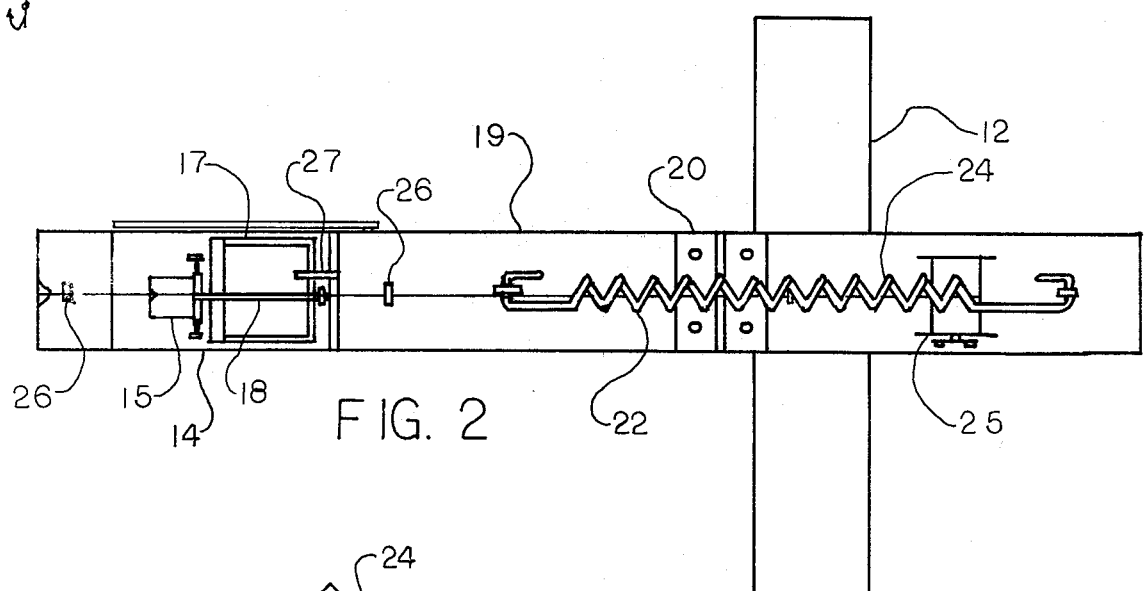
FIG. 2 is a top view of the apparatus shown in FIG. 1.

As shown in the drawings, a novel ice fishing apparatus of the invention comprises a main support member 11 with a transversely disposed cross member 12 attached thereto with a screw 13. Loosening screw 13 permits cross member 12 to be moved to a position longitudinal of support member 11 to simplify carrying or storage. A trigger mechanism 14 is mounted near one end of support member 11. Advantageously, the trigger 14 includes a vertically pivotable finger 15, a biased arm-releasing member 17 and retaining means 18 for holding the arm-releasing member in a biased position when the trigger is set (as will be described hereafter). A suitable commercially available trigger mechanism is a mouse trap.

Figure 3:
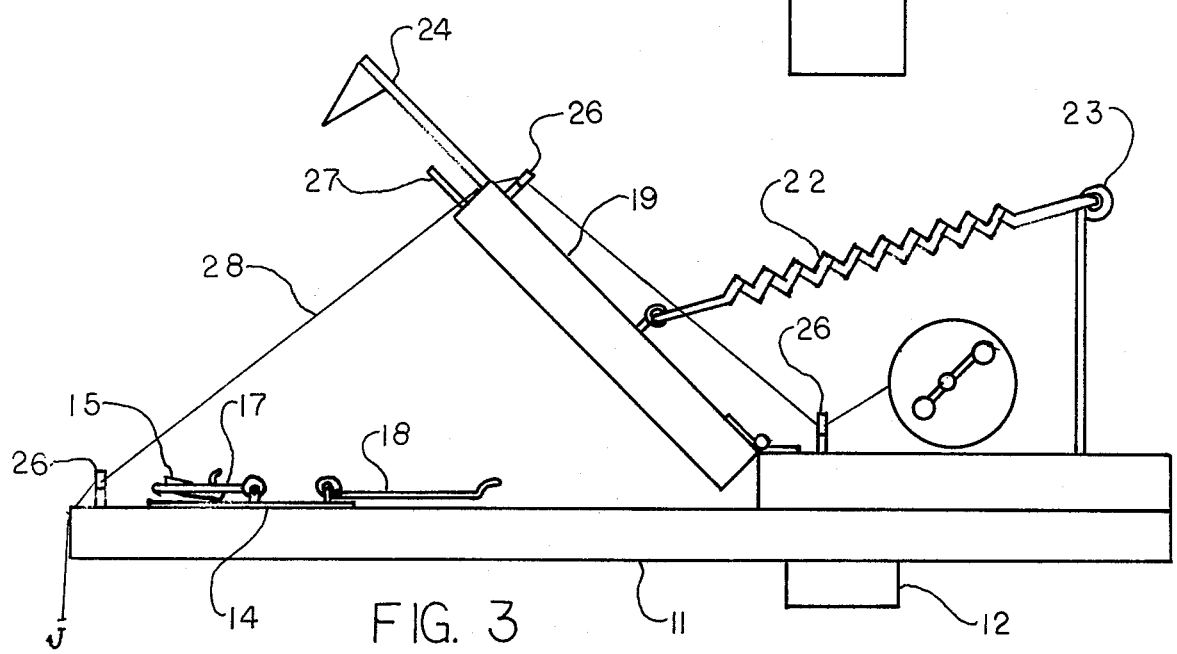
FIG. 3 is a side elevation of the ice fishing apparatus shown in FIG. 1 after the trigger has been tripped.

An arm 19 is pivotally connected by a hinge 20 to support member 11 with the pivot point of the arm adjacent the end of the arm which is remote from the trigger 14 as shown in the drawings. Advantageously, the arm 19 is pivotable in a vertical plane from a position substantially parallel to support member 11 to a position at an angle thereto as shown in FIGS. 1 and 3, respectively.

Biasing means shown as helical spring 22 has one end attached to arm 19 and the other end to a bracket 23. The spring 22 urges the free end 24 of arm 19 away from support member 11. The pull of spring 22 is adjustable by shortening or lengthening its effective length. This adjustment is important so arm 19 does not pull line 28 and the hook with an excessive force which may rip the hook from the fish's mouth but pulls with sufficient force to set the hook.

Fishing line-storing means 25 may be disposed on support member 11. The line-storing means may be a winding reel as shown or may be another type of winder familiar to fisherman. Line-guiding means such as eyelet guides 26 are located on the arm 19 and advantageously on the support member 11 near the trigger end thereof and also between the arm and the line-storing means 25.

In the use of the novel ice fishing apparatus of the invention, the cross member 12 is positioned transversely to support member 11 and screw 13 tightened. Then the trigger 14 is set by urging arm 19 against support member 11 and placing biased arm-releasing member 17 over a rod 27 extending from the free end 24 of the arm. The arm-releasing member 17 is held in place by positioning retaining means 18 over it and engaging the end of the retaining means with finger 15.

Line 28 from line-storing means 25 is drawn through guides 26 on the support member 11 and on arm 19 and over the free end of finger 15. The trigger end of the apparatus is then placed over a hole cut in the ice with the ends of cross member 12 and one end of support member 11 resting on the ice surrounding the hole. The end of the line with an appropriately baited hook is lowered through the hole into the water below. In the same way, a fisherman can place other ice fishing apparatus of the invention over nearby holes cut in the ice.

When a fish takes the bait and swallows the hook, the fish will attempt to swim away pulling the line and causing finger 15 to release retaining means 18. This will allow arm-releasing means 17 to move away from rod 27 permitting the free end 24 of arm 19 to be drawn suddenly away from support member 11. Since line 28 is positioned above arm 19 by guides 26, the pivoting movement of arm 19 will cause a sudden jerk in line 28 setting the hook in the mouth of the fish on the line.

Once the hook is set, the fish cannot escape and will be held on the line until the fisherman notices that the trigger of the apparatus has been tripped. The fisherman then at his convenience will walk to the hole and pick up the apparatus, drawing the fish from the hole. The fish is removed from the hook, the hook rebaited, the trigger reset, the apparatus positioned over the hole and the line with the hook lowered into the water again.

The above description and drawings show that the novel ice fishing apparatus of the invention provides important advantages for a fisherman and increases his enjoyment of the sport. The apparatus automatically sets the hook when a fish has taken the line but does not operate prematurely. Further, the apparatus holds the fish on the line so the fisherman can remove it at his convenience. Moreover, the apparatus does not require the fisherman's constant attention to avoid loss of the fish. In addition, the apparatus can be manufactured relatively inexpensively from available components.

It will be apparent that various modifications may be made in the ice fishing apparatus described in detail and shown in the drawings within the scope of the invention. For example, the support member 11, the cross member 12 and the arm 19 may be made in different configurations and of various structural materials such as wood, plastic, metal, etc. and combinations thereof. Also, the biasing means 22 can take different forms such as a bent spring strip positioned between the arm 19 and the support member 11. In addition, the arm 19 may be a very bright color or a flag attached to attract the fisherman's attention when the trigger is tripped. Therefore, the invention is to be limited only by the following claims.

What is claimed is:

1. An ice fishing apparatus including a main support member, a cross member disposed transversely of said support member and attached thereto, a trigger including biasing means mounted on said support member near one end thereof, a fishing line-storing means disposed on said support member, an arm positioned between said trigger and said line-storing means pivotally connected to said support member with the pivot point of said arm adjacent the end thereof remote from said trigger and the free end of said arm being operatively connected to said trigger, second biasing means urging the free end of said arm away from said support member, a first line guide on the trigger end of said support member, a second line guide on the free end of said arm, and a third line guide between the pivotally connected end of said arm and said line-storing means; whereby a line threaded through said line guides is maintained in a vertical plane through said main support member as said arm is pivoted from a position substantially parallel to said support member to a position at an acute angle thereto.

2. An ice fishing apparatus according to claim 1 wherein said cross member is pivotable to a position longitudinal of said support member.

3. An ice fishing apparatus according to claim 1 wherein said trigger includes a vertically pivotable finger which is positioned so that the free end thereof is in the normal path of a line from said line-storing means through said line-guiding means on said arm to the end of said support member adjacent said trigger.

4. An ice fishing apparatus according to claim 3 wherein said trigger includes a biased arm-releasing member and retaining means for holding said arm-releasing member in a biased position when said trigger is set.

5. An ice fishing apparatus according to claim 1 wherein said biasing means is adjustable.

6. An ice fishing apparatus according to claim 1 wherein said biasing means is a helical spring.

7. An ice fishing apparatus according to claim 1 wherein said line-storing means includes a winding reel.

* * * * *